US012304730B2

(12) United States Patent
Lin

(10) Patent No.: US 12,304,730 B2
(45) Date of Patent: May 20, 2025

(54) ROLLER SHUTTER-TYPE INTELLIGENT GARBAGE CAN

(71) Applicant: Fuzhou Zhijing International Trade Co., Ltd, Fuzhou (CN)

(72) Inventor: Zengdong Lin, Fuzhou (CN)

( * ) Notice: Subject to any disclaimer, the term of this patent is extended or adjusted under 35 U.S.C. 154(b) by 0 days.

(21) Appl. No.: 18/606,043

(22) Filed: Mar. 15, 2024

(65) Prior Publication Data

US 2024/0217730 A1 Jul. 4, 2024

(51) Int. Cl.
*B65F 1/16* (2006.01)
*B65F 1/00* (2006.01)

(52) U.S. Cl.
CPC .......... *B65F 1/1638* (2013.01); *B65F 1/0026* (2013.01); *B65F 2210/168* (2013.01)

(58) Field of Classification Search
CPC . B65F 1/1638; B65F 1/0026; B65F 2210/168
USPC .................................................. 220/211, 350
See application file for complete search history.

(56) References Cited

U.S. PATENT DOCUMENTS 2,739,730 A * 3/1956 Jonas ........................ B65F 1/16 312/297
5,295,605 A * 3/1994 Kawahito .................. B01J 3/03 220/240
6,752,476 B2 * 6/2004 Lin ....................... B65F 1/1426 312/297
7,906,921 B2 * 3/2011 Wang .................... B65F 1/1607 318/266
8,348,080 B2 * 1/2013 Baptiste ................ B65F 1/1468 220/908
9,174,583 B2 * 11/2015 Kuhn ........................ B60R 7/04
2007/0266637 A1 * 11/2007 McGowan ................ B65F 1/06 220/908
2008/0264942 A1 * 10/2008 Shek ..................... B65F 1/1607 220/230
2010/0089920 A1 * 4/2010 Shek ..................... B65F 1/1607 220/211
2012/0048854 A1 * 3/2012 Lin ....................... B65F 1/1638 220/211

(Continued)

*Primary Examiner* — Orlando E Aviles
*Assistant Examiner* — Niki M Eloshway
(74) *Attorney, Agent, or Firm* — Daniel M. Cohn; Howard M. Cohn

(57) ABSTRACT

The present invention provides a roller shutter-type intelligent garbage can including a garbage can body, a garbage can cover and a garbage can head, wherein an upper end of the garbage can body is provided with the garbage can cover, an inner side of the garbage can body is also provided with the garbage can head including a closure assembly, a power assembly and a garbage can head body, an upper end of the garbage can head body is provided with an opening, and the power assembly is mounted on an inner side of the garbage can head body and can drive the closure assembly to close and open the opening of the garbage can head body. In the present invention, a blade assembly is disposed more reasonably and stably, connection between rollers and transmission wheels is also more stable, a connecting rod assembly has better synchronous transmission effect, multiple sets of power are not required between the power assemblies, and the opening and closing speed is higher by adopting the double-curtain opening mode.

8 Claims, 7 Drawing Sheets

(56) References Cited

U.S. PATENT DOCUMENTS

| | | | | |
|---|---|---|---|---|
| 2013/0270274 | A1* | 10/2013 | Pizzella | B65F 1/10 220/350 |
| 2018/0134486 | A1* | 5/2018 | Parker | B65F 1/1623 |

* cited by examiner

ROLLER SHUTTER-TYPE INTELLIGENT GARBAGE CAN

TECHNICAL FIELD

The present invention relates to the technical field of garbage cans, and in particular to a roller shutter-type intelligent garbage can.

BACKGROUND

The existing garbage can is not designed reasonably in the aspects of intelligence, deodorization, garbage can structure, etc. For the existing garbage can, the two-curtain opening mode is mostly used in the intelligent opening aspect, which requires the power mechanism to simultaneously take into account the opening and closing of the two-side curtain, so the structure is more complex, and there is a certain error in how to achieve synchronization, which will be caused by the problems of transmission system or motor, etc. It is difficult to eliminate this error through the mechanical structure design, while for the deodorization aspect, there is a lack of a reasonable deodorization box design, because there will be gaps between the blades of the curtain, waste odor will always be emitted upward, spray is used for most of the traditional deodorization methods, which easily leads to excessive humidity in the garbage can, more bacteria, and produce more odor; for the structure of the garbage can, the traditional garbage can is mostly formed in one piece, and this structure of the garbage can in flat packaging is very disadvantageous, its large volume is a serious burden for the enterprise production packaging and logistics transportation costs, and if consumers move, the large-volume garbage cans are difficult to package and take away, and would have been a waste if thrown away, thus bringing a lot of inconvenience to consumers.

There is a need for a roller shutter-type intelligent garbage can that addresses the problems set forth above.

SUMMARY

The present invention provides a roller shutter-type intelligent garbage can, which solves the problem that the structure of the existing intelligent open type garbage can is complicated and does not have a deodorizing function by technical transformation of the existing garbage can.

In order to achieve the above-mentioned object, the technical solution used in the present invention is:

a roller shutter-type intelligent garbage can includes a garbage can body, a garbage can cover and a garbage can head, wherein an upper end of the garbage can body is provided with the garbage can cover, an inner side of the garbage can body is also provided with the garbage can head including a closure assembly, a power assembly and a garbage can head body, an upper end of the garbage can head body is provided with an opening, and the power assembly is mounted on an inner side of the garbage can head body and can drive the closure assembly to close and open the opening of the garbage can head body.

Preferably, the closure assembly includes a curtain portion, the inner side of the garbage can head body is provided with a curtain lower hidden groove, a part of the curtain portion is hidden into the curtain lower hidden groove when opened, curtain sliding rails are disposed on both front and rear sides of the garbage can head body, rollers capable of sliding on the curtain sliding rails are respectively disposed on both sides of the curtain portion, and an output end of the power assembly drives the rollers to slide along the curtain sliding rails.

Preferably, the curtain portion includes a first curtain and a second curtain, the first curtain and the second curtain are disposed respectively on the left and right-sides in the curtain sliding rails, the curtain lower hidden groove includes a left lower hidden groove and a right lower hidden groove, a lower end of the first curtain is hidden in the left lower hidden groove, a lower end of the second curtain is hidden in the right lower hidden groove, and the power assembly drives the first curtain and the second curtain to be unfolded or folded along the curtain sliding rails.

Preferably, the power assembly includes a motor, a power gear, a connecting rod gear assembly, driven gears and transmission wheels, wherein the motor is mounted on the inner side of the garbage can head body and the output end thereof is connected to the power gear, the connecting rod gear assembly is rotatably mounted on the inner side of the garbage can head body via a movable bearing, the power gear is engaged and connected to the connecting rod gear assembly, the driven gears are movably mounted on the left and right-sides of the garbage can head body, the two ends of the connecting rod gear assembly are respectively engaged with the driven gears on the two sides, and the driven gears are coaxially connected to the transmission wheels, the transmission wheels are provided with roller grooves capable of driving the rollers to slide, and the transmission wheels drive the first curtain and the second curtain to be movably disposed along the curtain sliding rails.

Preferably, the first curtain and the second curtain are composed of blades and the rollers. A first jaw is disposed on one side of each of the blades, and a second jaw is disposed on the other side of each of the blades. The first jaw and the second jaw face opposite to each other, the first jaw is used for clamping one of the rollers with the second jaw of the previous blade, the second jaw is used for clamping the other roller with the first jaw of the next blade, the width of the rollers is greater than the width of the blades, the plurality of blades and the rollers are clamped with each other to form the first curtain and the second curtain, a closing rib is disposed at a joint between the first curtain and the second curtain, side clamping grooves are formed on the inner sides of the front and rear two ends of the garbage can head body, one ends of side clamping pieces are clamped in the side clamping grooves, the other ends of the side clamping pieces extend into the curtain lower hidden groove, the curtain sliding rails are disposed on the side clamping pieces, and wheel grooves for nesting the driven gears and the transmission wheels of the power assembly are formed at the outer left and right ends of the side clamping piece.

Preferably, the closing rib includes a first rib and a second rib, the first rib is protruded at the right-side end face, in the direction close to the second curtain, of the first curtain, the second rib is protruded at the left-side end face, in the direction close to the first curtain, of the second curtain, and the first rib and the second rib are alternately disposed.

Preferably, the power assembly further includes a synchronizing shaft, the driven gears are distributed on both sides of the synchronizing shaft and are synchronously driven by means of the motor connected to the power gears on one side, and the synchronizing shaft simultaneously penetrates through the wheel grooves on the side clamping pieces at the front and rear ends of the garbage can head body.

Preferably, a control board is mounted in the garbage can head body, a prompt lamp is disposed on one side of the control board, a control button is connected to the control board, a box-clamping groove is formed on the inner side of the garbage can head body, a deodorization box is mounted in the box-clamping groove, a mounting clamping position is disposed protruding from a back of the deodorization box, the mounting clamping position extends into the box-clamping groove, a deodorization box cover is mounted on an upper end face of the deodorization box, and deodorization hole grooves are formed in a top face of the deodorization box cover, and side and bottom faces of the deodorization box.

Preferably, an upper end of the garbage can cover is provided with an annular protrusion, an upper end of the annular protrusion is covered with a decorative frame, a control panel is disposed on the side, corresponding to the control board, of the decorative frame, the control button passes up through the garbage can cover and abuts against the control panel, and an infrared sensor is further integrated to the control board.

Preferably, the decorative frame is magnetically connected to the annular protrusion.

Compared to the prior art, the beneficial effects of the present invention are:

(1) in the present invention, a double-curtain opening mode is used, and the curtain lower hidden groove is disposed on two sides. Moreover, in the present invention, the curtain blades redisposed more reasonably and stably, and the connection between the rollers and the transmission wheels is also more stable; the first jaw and the second jaw are disposed on each of the blade, the first jaw and the second jaw face opposite to each other, the first jaw is used for clamping one of the rollers with the second jaw of the previous blade, the second jaw is used for clamping the other roller with the first jaw of the next blade, the width of the rollers is greater than the width of the blades, and the plurality of blades and the rollers are clamped with each other to form the first curtain and the second curtain, and the rollers are embedded in side clamping groove curtain sliding rails inside the garbage can head body. The double-curtain opening mode is faster in opening and closing.

In the present invention, there is no need for multiple sets of power between the power assemblies, one motor drives the rollers at two ends to rotate synchronously via the connecting rod gear assembly, the transmission error of synchronism is small, it is more convenient and accurate to discard the garbage by opening the garbage can from the middle, and it is not prone to discarding garbage outside the garbage can.

(2) In the aspect of deodorization, in the present invention, the deodorization box is mounted at the position of the front clamping piece, the deodorization box is embedded in the front clamping piece via the mounting clamping position, the upper end face of the deodorization box is provided with the deodorization box cover, deodorant is replaced by means of opening and closing the deodorization box cover, which is very convenient, and the deodorization hole grooves of the deodorization box are directed towards the inner side of the garbage can body, and the emitted smell is directed towards the garbage, so that the deodorization effect is better.

(3) By disposing the infrared sensor, the opening and closing of the curtain can be realized by gesture control, which is very intelligent.

Figure 1:
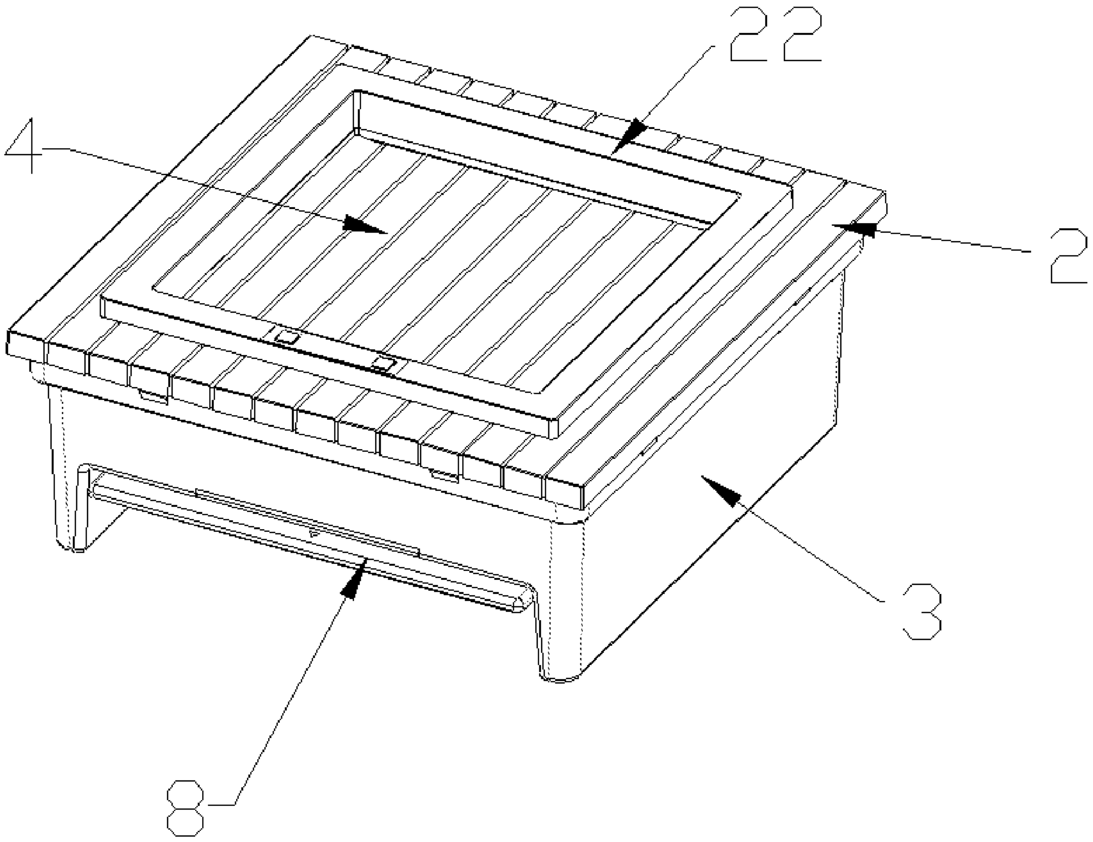
FIG. 1 is a structural diagram showing mounting of a garbage can cover and a garbage can head according to the present invention.
Figure 2:
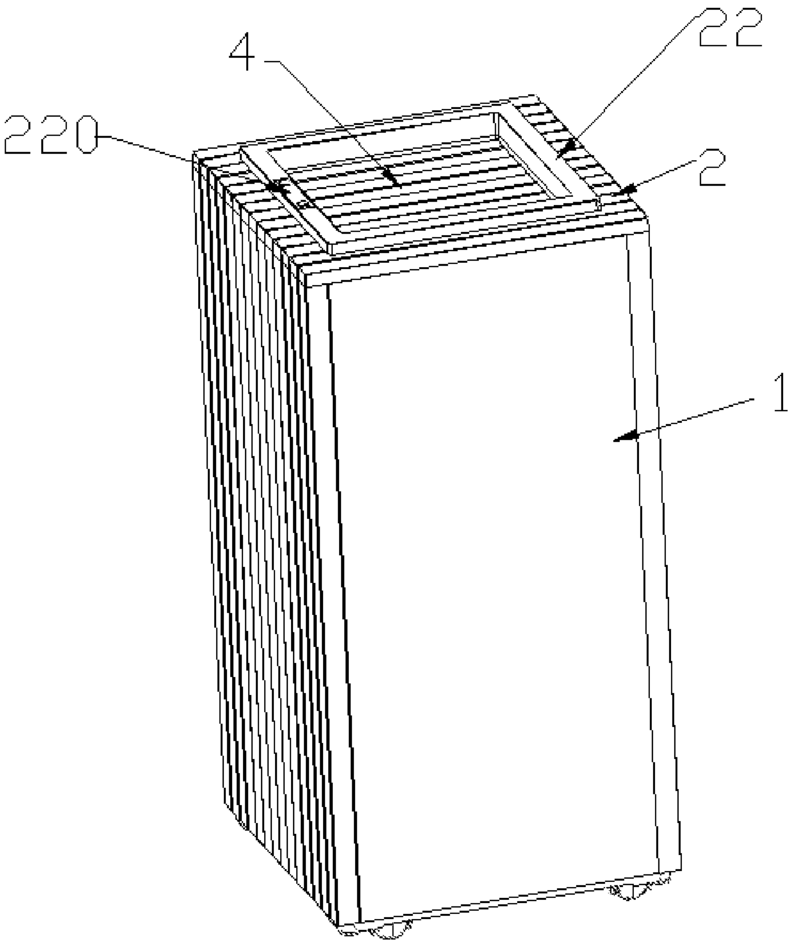
FIG. 2 is a schematic diagram showing a structure in which the garbage can cover is mounted on the garbage can body according to the present invention.
Figure 3:
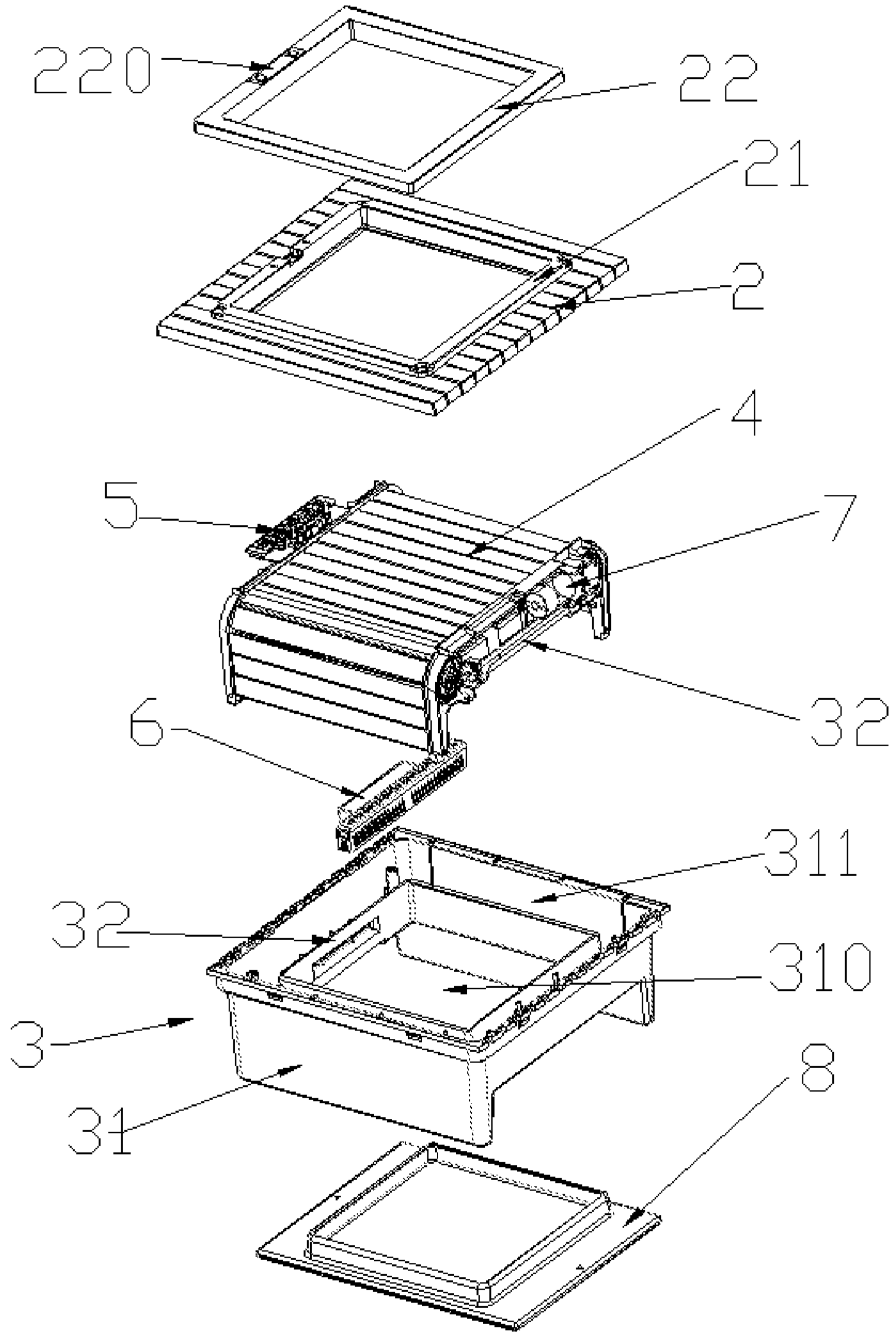
FIG. 3 is a schematic diagram showing a structure in which the garbage can cover and the garbage can head are detached according to the present invention.

reference numerals: garbage can body 1; garbage can cover 2; annular protrusion 21; decorative frame 22; control panel 220; garbage can head 3; garbage can head body 31; opening 310; curtain lower hidden groove 311; curtain sliding rail 312; side clamping groove 313; box-clamping groove 314; side clamping piece 32; wheel groove 320; curtain portion 4; blade 41; first jaw 411; second jaw 412; roller 42; first curtain 43; second curtain 44; closing rib 45; first rib 451; second rib 452; control module 5; control board 51; prompt lamp 52; control button 53; infrared sensor 54; deodorization box 6; deodorization hole groove 61; deodorization box cover 62; mounting clamping position 63; power assembly 7; motor 71; power gear 72; driven gear 73; transmission wheel 74; roller groove 740; connecting rod gear assembly 75; movable bearing 76; synchronizing shaft 77; bagging ring 8.

DETAILED DESCRIPTION

Embodiments of the present invention will be described in detail with reference to the accompanying drawings and examples hereinafter.

With reference to FIGS. 1-11, the present invention provides a roller shutter-type intelligent garbage can, including a garbage can body 1, a garbage can cover 2 and a garbage can head 3, wherein an upper end of the garbage can body 1 is provided with the garbage can cover 2, an inner side of the garbage can body 1 is also provided with the garbage can head 3 including a closure assembly, a power assembly 7 and a garbage can head body 31, an upper end of the garbage can head body 31 is provided with an opening 310, and the power assembly 7 is mounted on an inner side of the garbage can head body 31 and can drive the closure assembly to close and open the opening 310 of the garbage can head body 31.

Further, in order to achieve that the closure assembly can open or close the opening 310 of the garbage can head body 31, the closure assembly includes a curtain portion 4, the inner side of the garbage can head body 31 is provided with a curtain lower hidden groove 311, a part of the curtain portion 4 is hidden into the curtain lower hidden groove 311 when opened, curtain sliding rails 312 are disposed on front and rear sides of the garbage can head body 31, rollers 42 capable of sliding on the curtain sliding rails 312 are respectively disposed on both sides of the curtain portion 4, and an output end of the power assembly 7 drives the rollers 42 to slide along the curtain sliding rails 312.

Further, in order to achieve a double-open curtain structure, the curtain portion 4 includes a first curtain 43 and a second curtain 44, the first curtain 43 and the second curtain 44 are disposed respectively on the left and right-sides in the curtain sliding rails 312, the curtain lower hidden groove 311 includes a left lower hidden groove and a right lower hidden groove, a lower end of the first curtain 43 is hidden in the left lower hidden groove, a lower end of the second curtain 44 is hidden in the right lower hidden groove, and the power assembly 7 drives the first curtain 43 and the second curtain 44 to be unfolded or folded along the curtain sliding rails 312.

Figure 4:
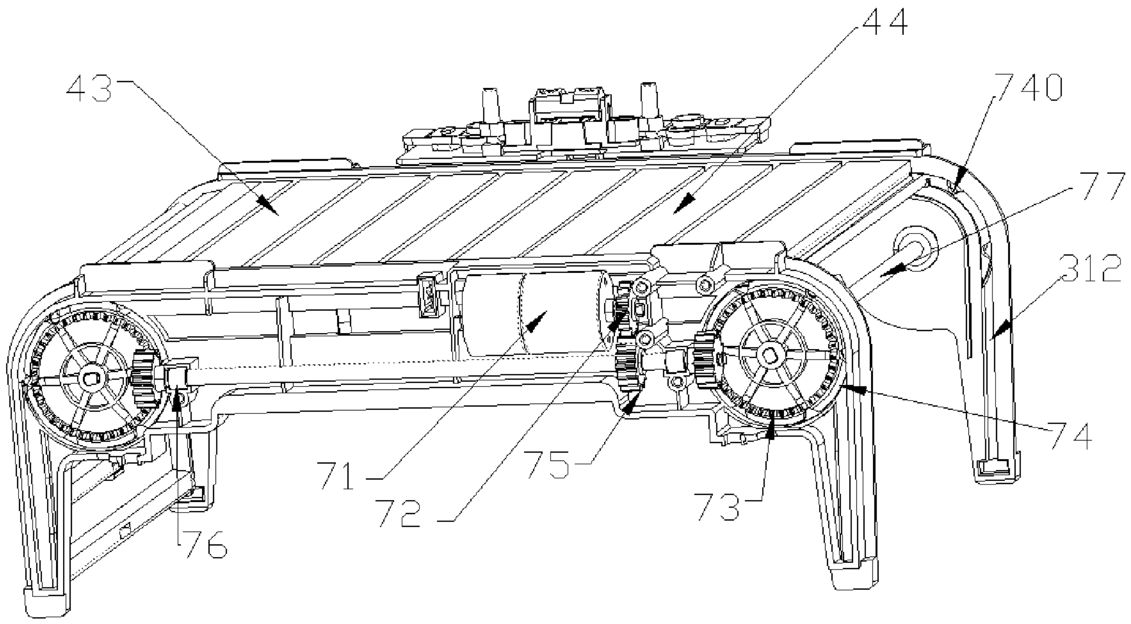
FIG. 4 is a schematic diagram showing mounting of a power assembly and a curtain portion according to the present invention.
Figure 5:
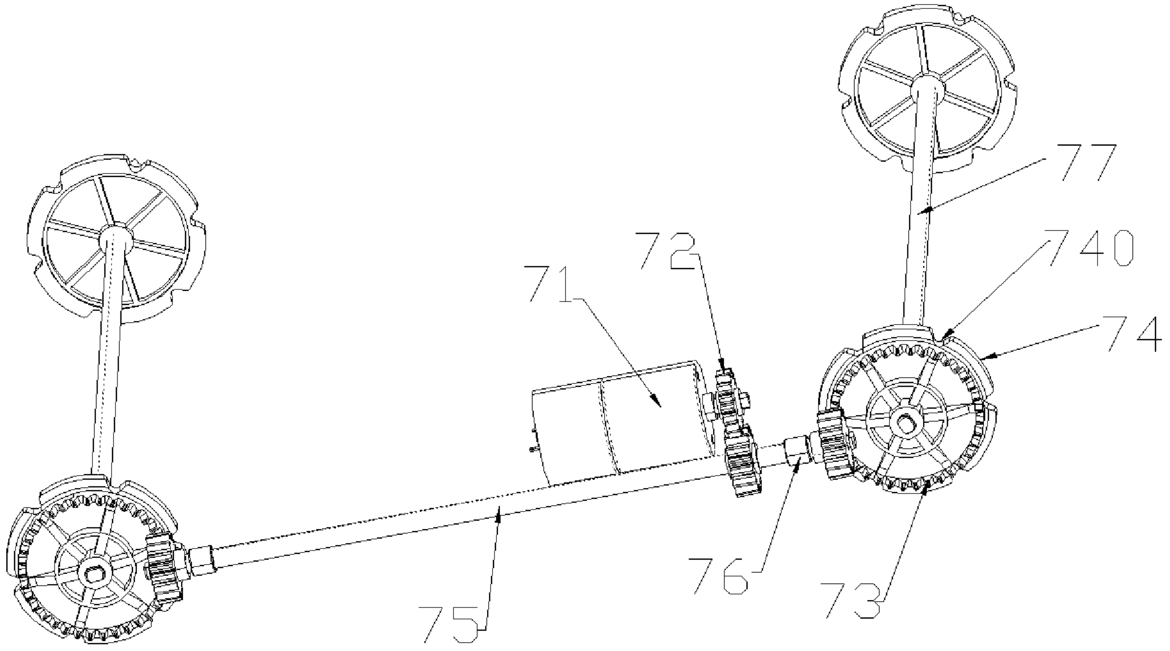
FIG. 5 is a schematic diagram showing the connection of the power assembly according to the present invention.
Figure 6:
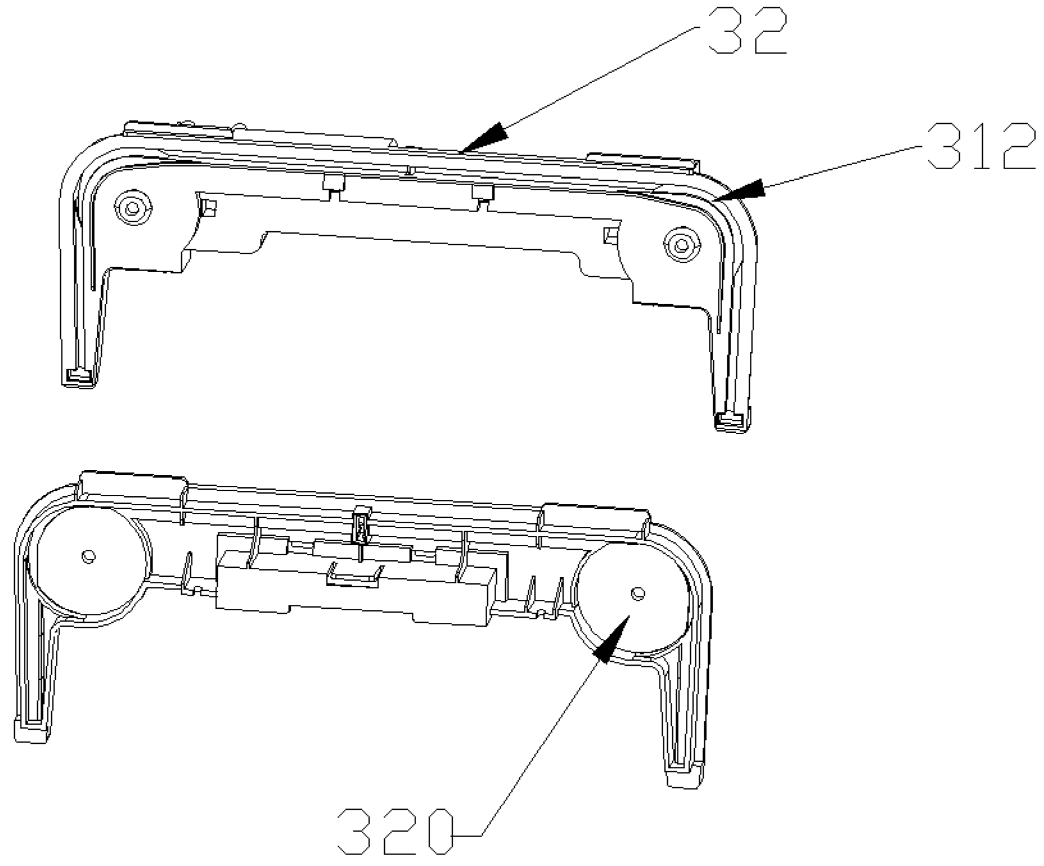
FIG. 6 is a schematic diagram showing a side clamping piece according to the present invention.
Figure 7:
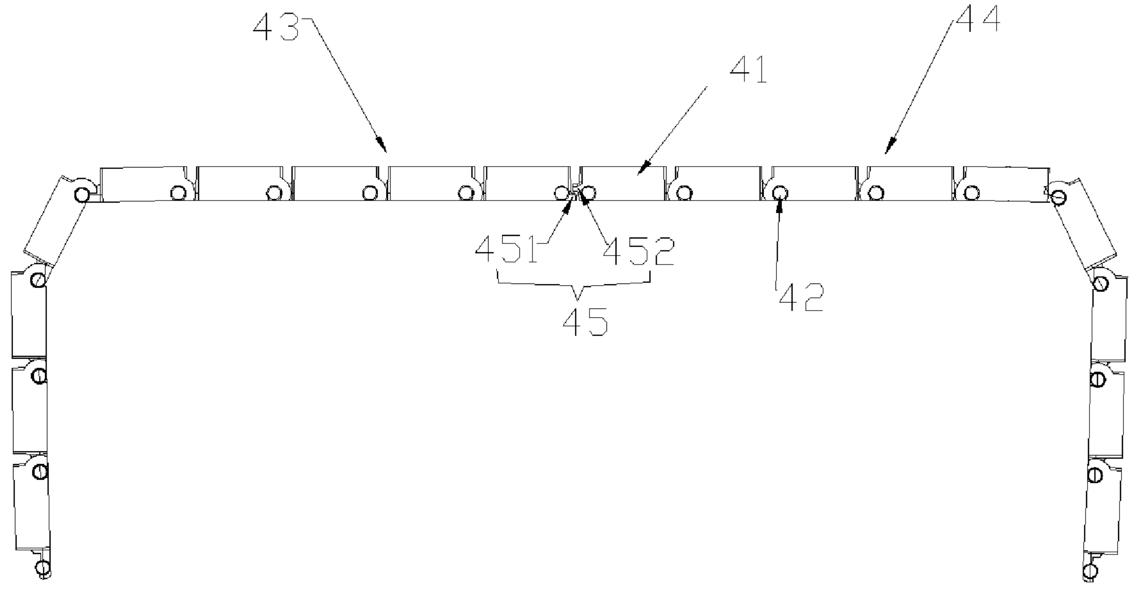
FIG. 7 is a schematic diagram showing a curtain structure according to the present invention.
Figure 8:
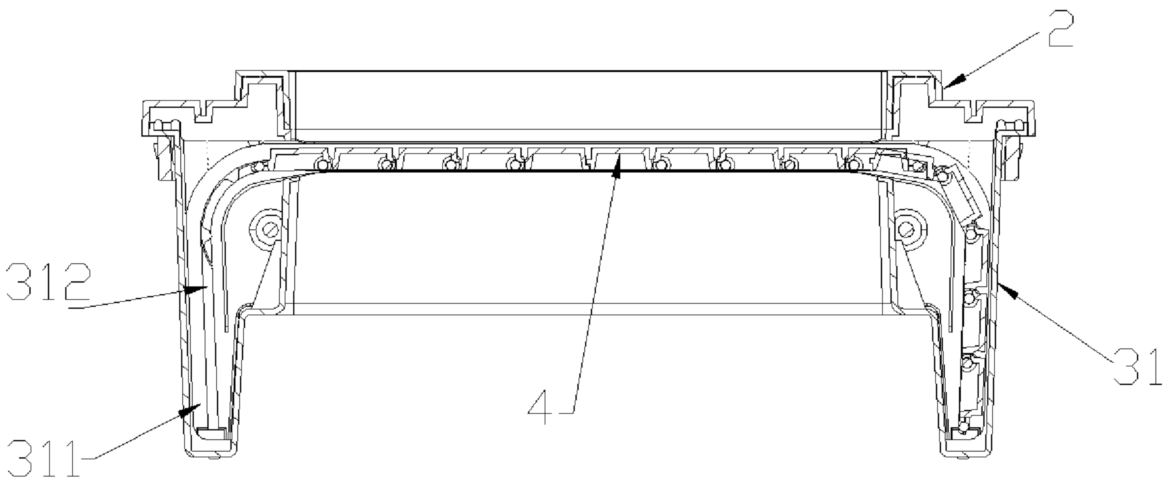
FIG. 8 is a schematic diagram showing a cross-sectional structure of a garbage can head body according to the present invention.

Further, as shown in FIGS. 4 and 5, the power assembly 7 includes a motor 71, a power gear 72, a connecting rod gear assembly 75, driven gears 73 and transmission wheels 74, wherein the motor 71 is mounted on the inner side of the garbage can head body 31 and an output end thereof is connected to the power gear 72, the connecting rod gear assembly 75 is rotatably mounted on the inner side of the garbage can head body 31 via a movable bearing 76, the power gear 72 is engaged and connected to the connecting rod gear assembly 75, and the driven gears 73 are movably mounted on the left and right-sides of the garbage can head body 31; two ends of the connecting rod gear assembly 75 are respectively engaged with the driven gears 73 on the two sides, and the driven gears 73 are coaxially connected to the transmission wheels 74, the transmission wheels 74 are provided with roller grooves 740 capable of driving the rollers 42 to slide, and the transmission wheels 74 drive the first curtain 43 and the second curtain 44 to be movably disposed along the curtain sliding rails 312.

The curtain portion 4 here is a double-open curtain, the rollers 42 are double-side rollers 42, and the rollers 42 on both sides are both inserted into the curtain sliding rails 312 on both sides, wherein the number of the rollers 42 is appropriate for supporting the weight of the curtain portion 4 and is multiple, the rollers 42 are distributed in an array manner on the curtain portion 4; when the curtain portion 4 is closed, the first curtain 43 and the second curtain 44 are oppositely connected at the middle position of the opening 310 of the garbage can head body 31; and when the curtain portion 4 is opened, the first curtain 43 and the second curtain 44 move along the curtain sliding rails 312 to the curtain lower hidden groove 311 on both sides until the opening 310 of the garbage can head body 31 is fully opened, and the opening and closing speed is faster.

The output end of the motor 71 disposed in the present application is provided with the power gear 72, the inner side of the garbage can head body 31 is provided with the movable bearing 76, the connecting rod gear assembly 75 passes through the movable bearing 76, the middle part of the connecting rod gear assembly 75 is provided with a gear to be engaged with the power gear 72, and gears disposed at the two ends of the connecting rod gear assembly 75 are respectively engaged with the driven gear 73; when the power gear 72 rotates, the driven gears 73 on the left and right-sides are driven to rotate in a reverse direction via the connecting rod gear, and the transmission wheels 74 are driven to rotate; and the rollers 42 are disposed in the roller grooves 740 and are driven by the transmission wheels 74 to move along the curtain sliding rails 312, and the first curtain 43 and the second curtain 44 are unfolded or folded along the curtain sliding rails 312 to open or close the garbage can.

Figure 9:
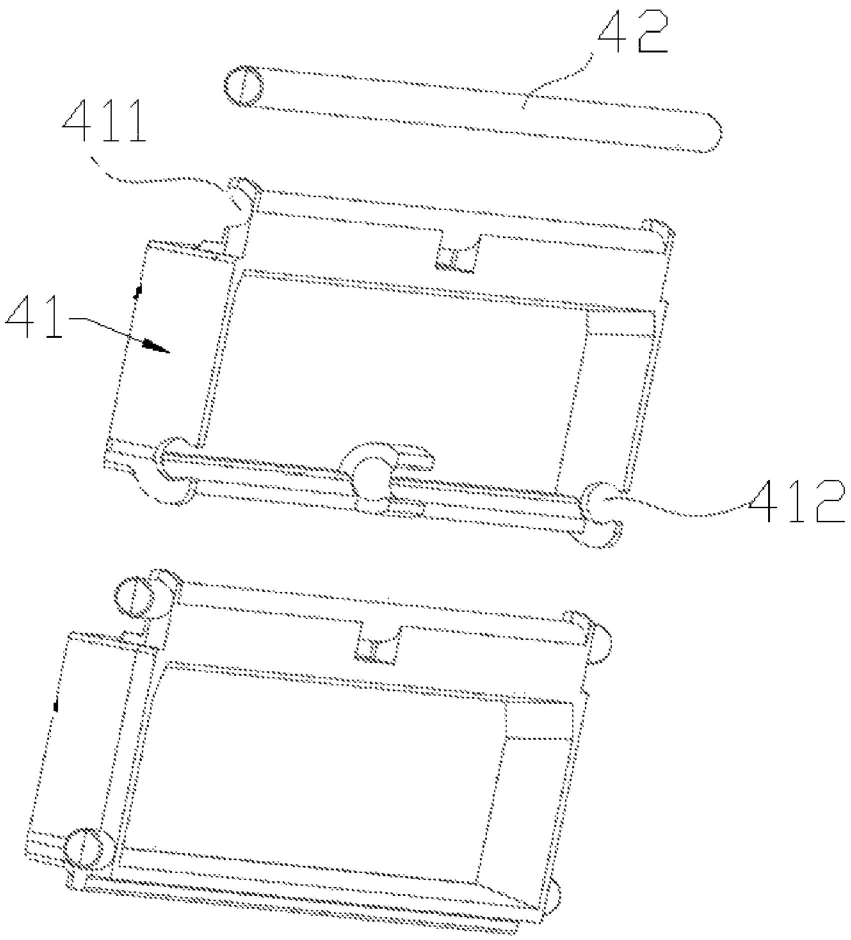
FIG. 9 is a schematic diagram showing detaching a curtain structure according to the present invention.

Further, as shown in FIG. 9, the first curtain 43 and the second curtain 44 are composed of blades 41 and the rollers 42. A first jaw 411 is disposed on one side of each of the blades 41, and a second jaw 412 is disposed on the other side. The first jaw 411 and the second jaw 412 face opposite to each other, wherein the first jaw 411 is used for clamping one of the rollers 42 with the second jaw 412 of the previous blade 41, the second jaw 412 is used for clamping the other roller 42 with the first jaw 411 of the next blade 41, and the width of the roller 42 is greater than the width of the blade 41; the plurality of blades 41 and the rollers 42 are clamped with each other to form the first curtain 43 and the second curtain 44, a closing rib 45 is disposed at a joint between the first curtain 43 and the second curtain 44, side clamping grooves 313 are formed on the inner sides of the front and rear ends of the garbage can head body 31, one ends of side clamping pieces 32 are clamped in the side clamping grooves 313, and the other ends of the side clamping pieces 32 extend into the curtain lower hidden groove 311, wherein the curtain sliding rails 312 are disposed on the side clamping pieces 32, and wheel grooves 320 for nesting the driven gears 73 and the transmission wheels 74 are formed at the outer left and right ends of the side clamping piece 32. Preferably, the side clamping pieces 32 and the garbage can head body 31 are U-shaped in cross-section.

Further, the closing rib 45 includes a first rib 451 and a second rib 452, wherein the first rib 451 is protruded at the right-side end face, in the direction close to the second curtain 44, of the first curtain 43, the second rib 452 is protruded at the left-side end face, in the direction close to the first curtain 43, of the second curtain 44, and the first rib 451 and the second rib 452 are alternately disposed. The first curtain 43 and the second curtain 44 are alternately spliced by means of the closing rib 45, so that the sealing property is better.

Further, as shown in FIG. 5, the power assembly 7 further includes a synchronizing shaft 77, the driven gears 73 are distributed on both sides of the synchronizing shaft 77 and are synchronously driven by means of the motor 71 connected to the power gear 72 on one side, and the synchronizing shaft 77 simultaneously penetrates through wheel grooves 320 on the side clamping pieces 32 at both front and rear ends of the garbage can head body 31.

Figure 10:
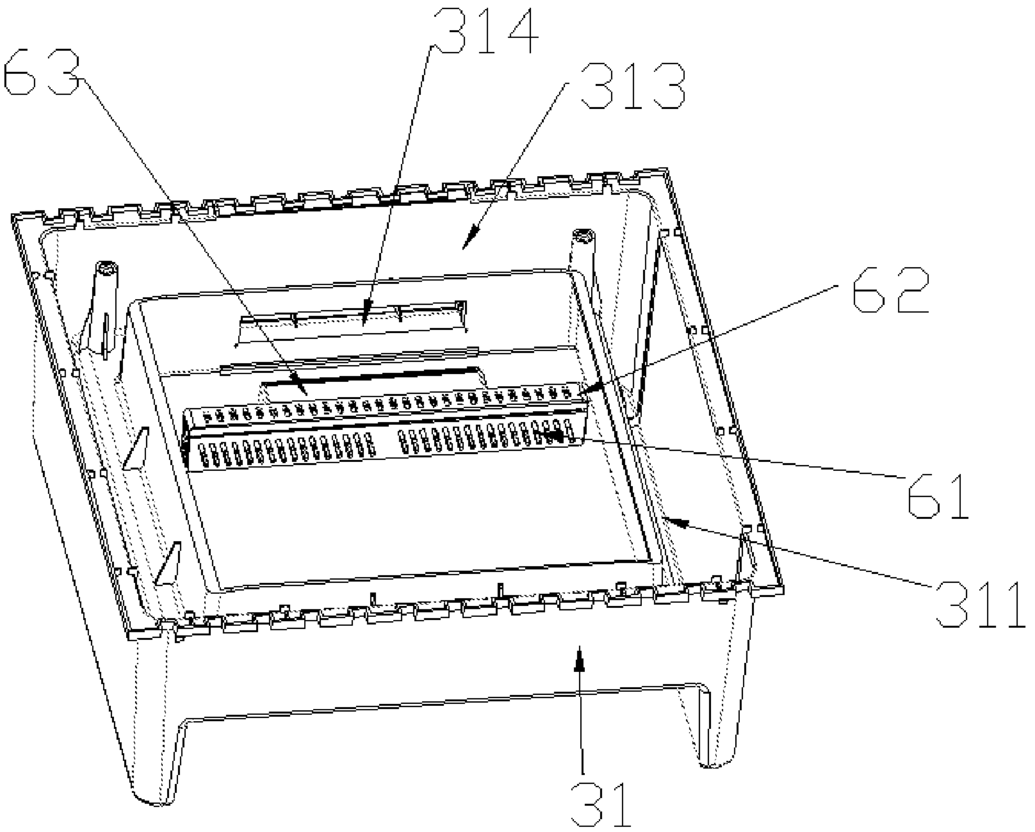
FIG. 10 is a schematic diagram showing mounting of a deodorization box according to the present invention.
Figure 11:
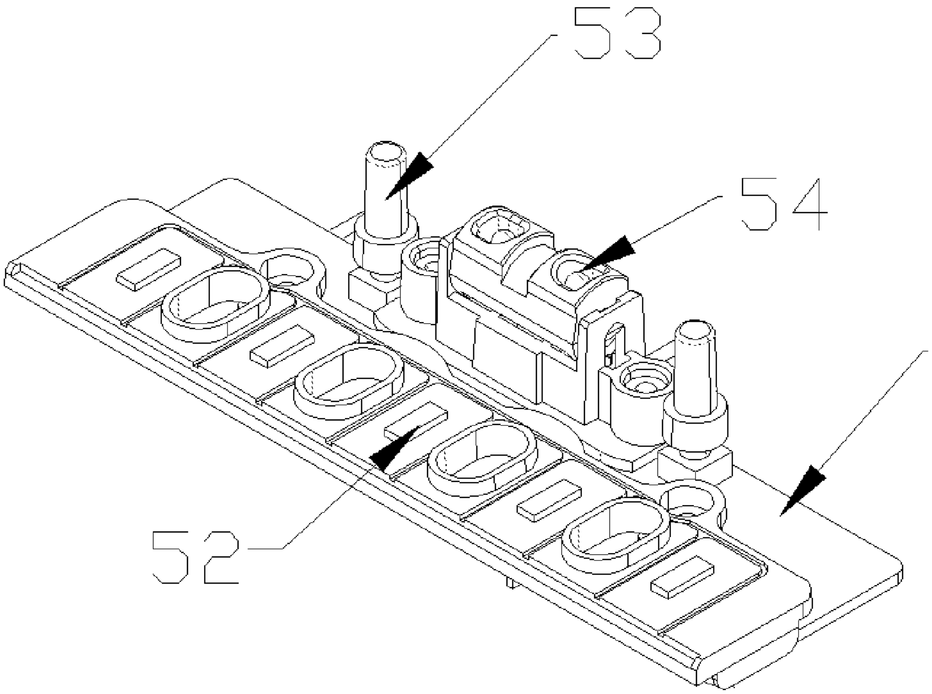
FIG. 11 is a schematic diagram showing a control module according to the present invention.

Further, as shown in FIGS. 10 and 11, a control module 5 is mounted in the garbage can head body 31 and includes a control board 51, a prompt lamp 52 is disposed on one side of the control board 51, a control button 53 is connected to the control board 51, a box-clamping groove 314 is formed on the inner side of the garbage can head body 31, a deodorization box 6 is mounted in the box-clamping groove 314, a mounting clamping position 63 is disposed protruding from aback of the deodorization box 6, the mounting clamping position 63 extends into the box-clamping groove 314, and a deodorization box cover 62 is mounted on an upper end face of the deodorization box 6, and deodorization hole grooves 61 are formed in a top face of the deodorization box cover 62, and side and bottom faces of the deodorization box 6.

In a more preferred manner, the box-clamping groove 314 is disposed at the inner side face of a side clamping groove 313, the side clamping groove 313 is provided with the box-clamping groove 314 for inserting the mounting clamping position of the deodorization box 6, a deodorization box cover 62 is disposed on the deodorization box 6, the deodorization box cover 62 can be opened for replacement of a deodorization agent, and deodorization hole grooves 61 formed in the deodorization box 6 are directed towards the inner side of the garbage can body 1 so as to facilitate deodorization of odor of garbage.

Further, an upper end of the garbage can cover 2 is provided with an annular protrusion 21, an upper end of the annular protrusion 21 is covered with a decorative frame 22, a control panel 220 is disposed on the side, corresponding to the control board 51, of the decorative frame 22, the control button 53 passes up through the garbage can cover and abuts against the control panel 220, and an infrared sensor 54 is further integrated to the control board 51.

The induction principle of the infrared sensor 54 is: an infrared ray emitted by an infrared ray emitting device does not encounter a blocking object to be refracted back within a certain height (such as 10 cm, 20 cm, 30 cm, etc.), and a receiving device fails to receive a refraction signal, i.e., indicating that the curtain portion 4 does not need to be opened; when a person moves to the position over the infrared sensing lamp by hand at a corresponding height, at this time, the receiving device receives the signal that the infrared ray is refracted back and transmits the signal to the control board 51; the control board 51 turns on a switch to emit an electric signal to the motor 71 to open the curtain portion 4; and after opened, the curtain portion 4 can be closed by setting a fixed opening time. The control board 51 controls the motor 71 to close the curtain portion 4; as stated above, when the curtain portion 4 is opened or closed, the control board 51 can cooperate with the prompt lamp 52 to flash; when it is necessary to replace the garbage bag, the curtain portion 4 can be normally opened by means of a manual normally open key, and finally is closed by means of a manual close button; and after manual closing, a next round of infrared induction opening mode is started.

Further, the decorative frame 22 is magnetically connected to the annular protrusion 21. A magnetic attraction block can be disposed at the end of the annular protrusion 21, a magnetic attraction block can also be disposed at the corresponding position of the decorative frame 22, and when covering connection is needed, the decorative frame 22 and the annular protrusion 21 can be directly attracted by means of magnetic attraction positioning, which is very convenient; and the decorative frame 22 can be customized with different colors for consumers to choose to meet the needs of different consumers and different places.

A bagging ring 8 is also disposed below the opening 310 of the garbage can head body 31 to facilitate the bagging.

The present invention has the following features:

(1) in the present invention, a double-curtain opening mode is used, and the curtain lower hidden groove is disposed on two sides. Moreover, in the present invention, the curtain blades are disposed more reasonably and stably, and the connection between the roller and the transmission wheels is also more stable; the first jaw and the second jaw are disposed on each of the blades, the first jaw and the second jaw face opposite to each other, the first jaw is used for clamping one of the rollers with the second jaw of the previous blade, the second jaw is used for clamping the other roller with the first jaw of the next blade, the width of the roller is greater than the width of the blades, and the plurality of blades and the rollers are clamped with each other to form the first curtain and the second curtain, and the rollers are embedded in side clamping groove curtain sliding rails inside the garbage can head body. There is no need for multiple sets of power between the power assemblies, one motor drives the rollers at two ends to rotate synchronously via the connecting rod gear assembly, the transmission error of synchronism is small, the speed of opening the curtain is fast, it is more convenient and accurate to discard the garbage by opening the garbage can from the middle, and it is not prone to discarding garbage outside the garbage can.

(2) In the aspect of deodorization, in the present invention, the deodorization box is mounted at the position of the front clamping piece, the deodorization box is embedded in the front clamping piece via the mounting clamping position, the upper end face of the deodorization box is provided with the deodorization box cover, deodorant is replaced by means of opening and closing the deodorization box cover, which is very convenient, and the deodorization hole grooves of the deodorization box are directed towards the inner side of the garbage can body, and the emitted smell is directed towards the garbage, so that the deodorization effect is better.

(3) By disposing the infrared sensor, the opening and closing of the curtain can be realized by gesture control, which is very intelligent.

Finally, it is noted that the above-mentioned embodiments illustrate rather than limit the present invention, and that a person skilled in the art will appreciate that modifications and equivalents may be made thereto without departing from the spirit and scope of the present invention as defined by the appended claims.

Standard parts used in the present invention are all commercially available, the irregular parts can be customized according to what is specified in the description and drawings; the specific connection methods of each part are conventional means such as bolts, rivets and welding which are mature in the prior art; the machinery, parts and equipment are conventional models in the prior art; and the circuit connection is conventional connection methods in the prior art, which will not be described in detail here.

According to the present invention, unless explicitly stipulated and limited otherwise, the terms "mounted", "coupled", "connected", "fixed" and the like are to be understood in a broad sense, for example, they may be fixedly connected or detachably connected, or integrated; may be a mechanical connection or an electrical connection; it can be directly coupled or indirectly coupled through an intermediate medium, and can be the communication between two elements or the interaction relationship between two elements. The specific meaning of the above terms in the present invention can be understood in detail by a person skilled in the art.

The invention claimed is:

1. A roller shutter-type intelligent garbage can, comprising a garbage can body, a garbage can cover and a garbage can head, wherein an upper end of the garbage can body is provided with the garbage can cover, an inner side of the garbage can body is also provided with the garbage can head, the garbage can head comprises a closure assembly, a power assembly and a garbage can head body, an upper end of the garbage can head body is provided with an opening, and the power assembly is mounted on an inner side of the garbage can head body and can drive the closure assembly to close and open the opening of the garbage can head body;

wherein the closure assembly comprises a curtain portion, the inner side of the garbage can head body is provided with a curtain lower hidden groove, a part of the curtain portion is hidden into the curtain lower hidden groove when opened, curtain sliding rails are disposed on both front and rear sides of the garbage can head body, rollers capable of sliding on the curtain sliding rails are respectively disposed on both sides of the curtain portion, and an output end of the power assembly drives the rollers to slide along the curtain sliding rails; and wherein the curtain portion comprises a first curtain and a second curtain, the first curtain and the second curtain are disposed respectively on the left and right-sides in the curtain sliding rails, the curtain lower hidden groove comprises a left lower hidden groove and a right lower hidden groove, a lower end of the first curtain is hidden in the left lower hidden groove, a lower end of the second curtain is hidden in the right lower hidden groove, and the power assembly drives the first curtain and the second curtain to be unfolded or folded along the curtain sliding rails.

2. The roller shutter-type intelligent garbage can according to claim 1, wherein the power assembly comprises a motor, a power gear, a connecting rod gear assembly, driven gears and transmission wheels, the motor is mounted on the inner side of the garbage can head body and an output end thereof is connected to the power gear, the connecting rod gear assembly is rotatably mounted on the inner side of the garbage can head body via a movable bearing, the power gear is engaged and connected to the connecting rod gear assembly, the driven gears are movably mounted on the left and right-sides of the garbage can head body, two ends of the connecting rod gear assembly are respectively engaged with the driven gears on the two sides, and the driven gears are coaxially connected to the transmission wheels, the transmission wheels are provided with roller grooves capable of driving the rollers to slide, and the transmission wheels drive the first curtain and the second curtain to be movably disposed along the curtain sliding rails.

3. The roller shutter-type intelligent garbage can according to claim 2, wherein the first curtain and the second curtain are composed of blades and the rollers, a first jaw is disposed on one side of each of the blades, and a second jaw is disposed on the other side of each of the blades, the first jaw and the second jaw face opposite to each other, the first jaw is used for clamping one of the rollers with the second jaw of the previous blade, the second jaw is used for clamping the other roller with the first jaw of the next blade, the width of the rollers is greater than the width of the blades, the plurality of blades and the rollers are clamped with each other to form the first curtain and the second curtain, a closing rib is disposed at a joint between the first curtain and the second curtain, side clamping grooves are formed on the inner sides of the front and rear two ends of the garbage can head body, one ends of side clamping pieces are clamped in the side clamping grooves, the other ends of the side clamping pieces extend into the curtain lower hidden groove, the curtain sliding rails are disposed on the side clamping pieces, and wheel grooves for nesting the driven gears and the transmission wheels of the power assembly are formed at the outer left and right ends of the side clamping piece.

4. The roller shutter-type intelligent garbage can according to claim 3, wherein the closing rib comprises a first rib and a second rib, the first rib is protruded at the right-side end face, in the direction close to the second curtain, of the first curtain, the second rib is protruded at the left-side end face, in the direction close to the first curtain, of the second curtain, and the first rib and the second rib are alternately disposed.

5. The roller shutter-type intelligent garbage can according to claim 3, wherein the power assembly further comprises a synchronizing shaft, the driven gears are distributed on both sides of the synchronizing shaft and are synchronously driven by means of the motor connected to the power gears on one side, and the synchronizing shaft simultaneously penetrates through the wheel grooves on the side clamping pieces at the front and rear ends of the garbage can head body.

6. The roller shutter-type intelligent garbage can according to claim 2, wherein a control board is mounted in the garbage can head body, a prompt lamp is disposed on one side of the control board, a control button is connected to the control board, a box-clamping groove is formed on the inner side of the garbage can head body, a deodorization box is mounted in the box-clamping groove, a mounting clamping position is disposed protruding from a back of the deodorization box, the mounting clamping position extends into the box-clamping groove, a deodorization box cover is mounted on an upper end face of the deodorization box, and deodorization hole grooves are formed in a top face of the deodorization box cover, and side and bottom faces of the deodorization box.

7. The roller shutter-type intelligent garbage can according to claim 6, wherein an upper end of the garbage can cover is provided with an annular protrusion, an upper end of the annular protrusion is covered with a decorative frame, a control panel is disposed on the side, corresponding to the control board, of the decorative frame, the control button passes up through the garbage can cover and abuts against the control panel, and an infrared sensor is further integrated to the control board.

8. The roller shutter-type intelligent garbage can according to claim 7, wherein the decorative frame is magnetically connected to the annular protrusion.

* * * * *